US006594506B1

(12) United States Patent
Vapaakoski et al.

(10) Patent No.: US 6,594,506 B1
(45) Date of Patent: Jul. 15, 2003

(54) ANTENNA STRUCTURE IN AN EXPANSION CARD FOR AN ELECTRONIC DEVICE

(75) Inventors: Simo Vapaakoski, Tampere (FI); Lauri-Pekka Alanko, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/579,254

(22) Filed: May 25, 2000

(30) Foreign Application Priority Data

May 28, 1999 (FI) ................................................ 991218

(51) Int. Cl.[7] ............................ H04B 1/38; H01Q 1/24; H04M 1/00

(52) U.S. Cl. ....................... 455/557; 455/558; 455/129; 455/90; 379/433.09; 379/433.01; 343/702; 343/797; 343/767; 439/131

(58) Field of Search .......................... 455/90, 129, 557, 455/558; 379/433.09, 433.01; 343/797, 702, 767; 439/131

(56) References Cited

U.S. PATENT DOCUMENTS

| | | | | | |
|---|---|---|---|---|---|
| 5,065,003 | A | | 11/1991 | Wakatsuki et al. | 235/472 |
| 5,361,061 | A | * | 11/1994 | Mays et al. | 340/7.54 |
| 5,583,521 | A | | 12/1996 | Williams | 343/702 |
| 5,628,055 | A | | 5/1997 | Stein | 455/89 |
| 5,752,857 | A | | 5/1998 | Knights | 439/638 |
| 5,809,115 | A | | 9/1998 | Inkinen | 379/93.05 |
| 5,867,131 | A | * | 2/1999 | Camp et al. | 343/702 |
| 5,870,279 | A | | 2/1999 | Mahany et al. | 361/679 |
| 5,913,174 | A | * | 6/1999 | Casarez et al. | 455/557 |
| 5,970,402 | A | * | 10/1999 | Vermeer | 343/906 |
| 6,181,284 | B1 | * | 1/2001 | Madsen et al. | 361/681 |
| 6,295,031 | B1 | * | 9/2001 | Wallace et al. | 343/702 |
| 6,348,893 | B1 | * | 2/2002 | Herranen et al. | 343/702 |
| 6,419,506 | B2 | * | 7/2002 | Jones et al. | 439/131 |
| 2001/0054985 | A1 | * | 12/2001 | Jones et al. | 343/906 |
| 2002/0080565 | A1 | * | 6/2002 | Teshima | 361/681 |

FOREIGN PATENT DOCUMENTS

| | | | | | |
|---|---|---|---|---|---|
| DE | 19520432 | A1 | | 12/1996 | |
| DE | 10053817 | A1 | * | 10/2000 | H01Q/1/24 |
| EP | 0279054 | A1 | | 8/1988 | |
| WO | WO 96/23326 | | | 8/1996 | |
| WO | WO 97/49141 | | | 12/1997 | |
| WO | WO 97/49194 | | | 12/1997 | |
| WO | WO 99/22420 | | | 5/1999 | |
| WO | WO 99/25441 | | | 5/1999 | |
| WO | WO 99/25442 | | | 5/1999 | |

* cited by examiner

*Primary Examiner*—Vivian Chin
*Assistant Examiner*—Kamran Afshar
(74) *Attorney, Agent, or Firm*—Perman & Green, LLP

(57) ABSTRACT

The present invention relates to an expansion card for an electronic device, preferably a card-like wireless communication device, which card (CP) comprises a cover surface (1) and a bottom surface (2) as well as an outer surface (3) edging said card (CP), and which card (CP) further comprises at least an antenna structure. Said antenna structure (ANT) is arranged as a flexible strip (4) attaching to said card (CP) and extending at least partly outside said outer surface (3). According to a preferred embodiment of the invention, the strip is also arranged for pulling out said card (CP) from an expansion card interface slot. According to another advantageous embodiment of the invention, said strip (4) is arranged to be folded against said card (CP).

15 Claims, 3 Drawing Sheets

ANTENNA STRUCTURE IN AN EXPANSION CARD FOR AN ELECTRONIC DEVICE

The present invention relates to a card-like wireless communication device as set forth in the preamble of claim 1. The invention also relates to a method in the manufacture of an expansion card for an electronic device as set forth in the preamble of claim 7. The invention also relates to an expansion card for an electronic device as set forth in the preamble of claim 9.

According to prior art, various electronic devices, such as portable personal computers (PC) are often equipped with an expansion card interface slot, to which a standardized expansion card can be connected. These expansion cards are intended to form a functional unit with the PC. The expansion cards can also contain the radio parts of a wireless communication device, including an antenna, wherein the PC can, by means of this card-like wireless communication device, communicate with other devices or a communication network, such as the GSM network (Global System for Mobile Communication). The antennas are used for the transmission and reception of radio-frequency signals, and the signals are transmitted between the radio part and the antenna of the wireless communication device normally by means of wires and connectors.

One known expansion card is a PC card complying with the PCMCIA standard (Personal Computer Memory Card International Association). PC cards are designed to be inserted fully inside a PC, but so-called extended PC cards are longer than ordinary PC cards. These extended PC cards are placed partly outside the PC, wherein the thickness and design of the PC cards may vary in this part to be placed outside the PC. In a manner known per se, this part usually contains the separate antenna of the wireless communication device.

Figure 1:
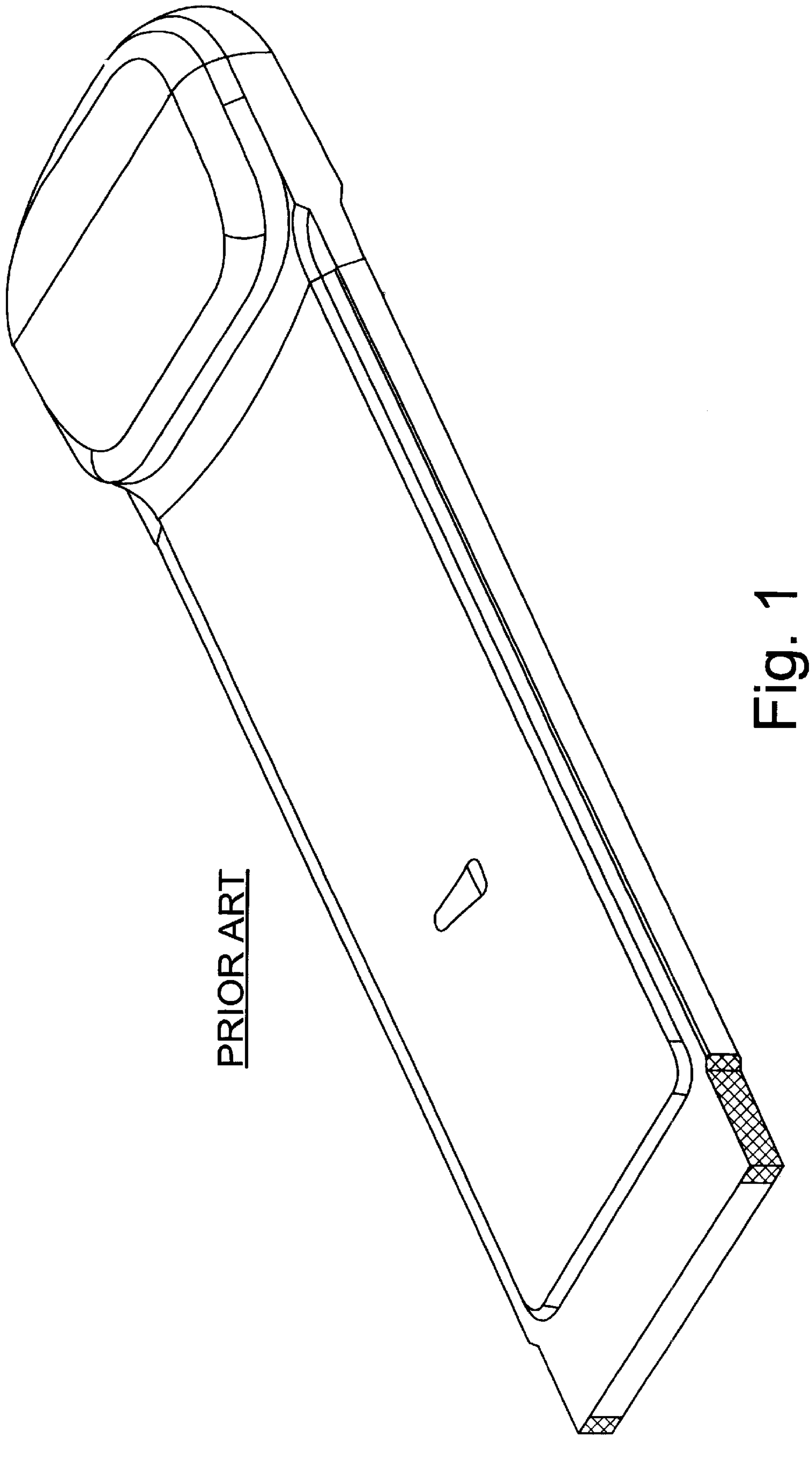
PRIOR ART Fig. 1

One known card-like wireless communication device comprising a transceiver with its antenna is the Nokia Cellular Card Phone, i.e. a card phone that can be connected to expansion card connections of PC card types 11 and 11 complying with the PCMCIA standard. One embodiment of the card phone according to prior art is shown in FIG. 1, and the operation of the card phone is described in more detail in e.g. U.S. Pat. No. 5,809,115. In the card phone, the antenna part containing the antenna is placed outermost in the part located outside the PC, this part being connected to the card-like part of the card phone that is placed at least partly inside the expansion card interface slot. Other known card-like wireless communication devices are presented in U.S. Pat. No. 5,628,055, disclosing a separate turnable antenna that can be attached to the end of the card, and U.S. Pat. No. 5,361,061, disclosing a foldable antenna pivoted on the top surface of the end of the extended card.

Other known expansion cards include e.g. a so-called CompactFlash (CF) card complying with the CFA standard (Compact Flash Association). For example for these CF cards, there are adapters of the size of the PCMCIA card, in which the CF card is placed for a PCMCIA interface. Also known are expansion cards for a wireless local area network (WLAN). Other expansion cards include also a so-called Miniature Card, whose size is only 38 mm×33 mm×3.5 mm, as well as a so-called SmartMedia card, whose size is only 45 mm×37 mm×0,76 mm, and a so-called MultiMediaCard (MMC), whose size is only 32 mm×24 mm×1.4 mm.

One drawback in known card-like wireless communication devices is that during the use and when placed in the expansion card interface slot, particularly the antenna structure forms a part protruding from the electronic device.

Furthermore, the interfaces often comprise a protective cover to protect the expansion card, which must be kept open when the antenna structure extends outside the electronic device. The protruding part of the antenna structure and the protective covers may stick in something particularly during the transportation and use of the device, as well as cause damage. Therefore, the card must be removed after the use and be stored separately from the device.

It is an aim of the present invention to eliminate the above-mentioned drawbacks by means of a card-like wireless communication device according to the invention. The card-like wireless communication device of the invention is characterized in what will be presented in the characterizing part of claim 1. The method in the manufacture of an electronic device according to the invention is characterized in what will be presented in the characterizing part of claim 7. The expansion card for an electronic device according to the invention is characterized in what will be presented in the characterizing part of claim 9.

The essential principle of the invention is to use a bendable, flexible strip-like antenna structure. In other respects, the card-like wireless communication device constitutes preferably a compact unit with standard dimensions. When unfolded, the antenna structure extends outside the electronic device, but the protruding part is a flexible, preferably solid part which is flexible and bendable upon touching, wherein the risk of damage is reduced, particularly in comparison with rigid, elongated antenna structures.

When the strip is folded against the card, the card does not need to be removed from the electronic device for the time of transportation, wherein it is faster to take the device and the card into use. At the same time, the insertions and removals of the card into and from the interface are reduced, wherein the wear and malfunction of the interface are reduced. Thanks to the flexible structure, the forces directed to the antenna structure are not transmitted to the attachments of the strip, wherein damage to the attachments and the card itself is avoided. This has also the advantage that the attachments are simple and small-sized, wherein the antenna structure according to the invention also utilizes as little space inside the card as possible, thereby vacating space for other components. Furthermore, the strip with its attachments is also easy and inexpensive to manufacture. It is often advantageous that the antenna is brought farther away from the electronic device to reduce the effect of electromagnetic interference, which is now made possible by the invention in a safe way.

The flexible antenna can be bent against the card, wherein it fits preferably entirely in the expansion card interface slot, preferably at least under a closed protective cover that is possibly provided to protect the interface. A particular advantage of the invention is that the strip can be used for pulling the card out from the expansion card interface slot, wherein a short card can be used also in devices with no mechanism for pushing the card out.

Another particular advantage of one embodiment of the invention is that when the antenna structure comprises two transverse antenna elements, good electrical functioning of the antenna in different position of the strip can be secured in such a way that a first antenna element is placed further away from the outer surface on the strip or at the outermost end of the unfolded strip, and a second antenna element is placed e.g. close to the outer surface. Thus, when the strip is bent against the card and placed in the expansion card interface slot, the second antenna element is exposed in the opening of the interface and thereby outermost in the direction of the cover surface and the bottom surface.

The invention is applicable for use particularly in electronic devices which are suitable for networks of low power radio frequency (LPRF) to be used as wireless local area networks, such as piconets, wherein the range of operation is normally from 0.1 to 10 m, even 100 m if necessary. These wireless networks operate in the ISM range at the frequency of 2.4 GHz. The invention is suitable for use in so-called Blue-tooth technology, whereby cables can be replaced by the radio channel e.g. between PC devices and peripheral equipment.

Figure 2:
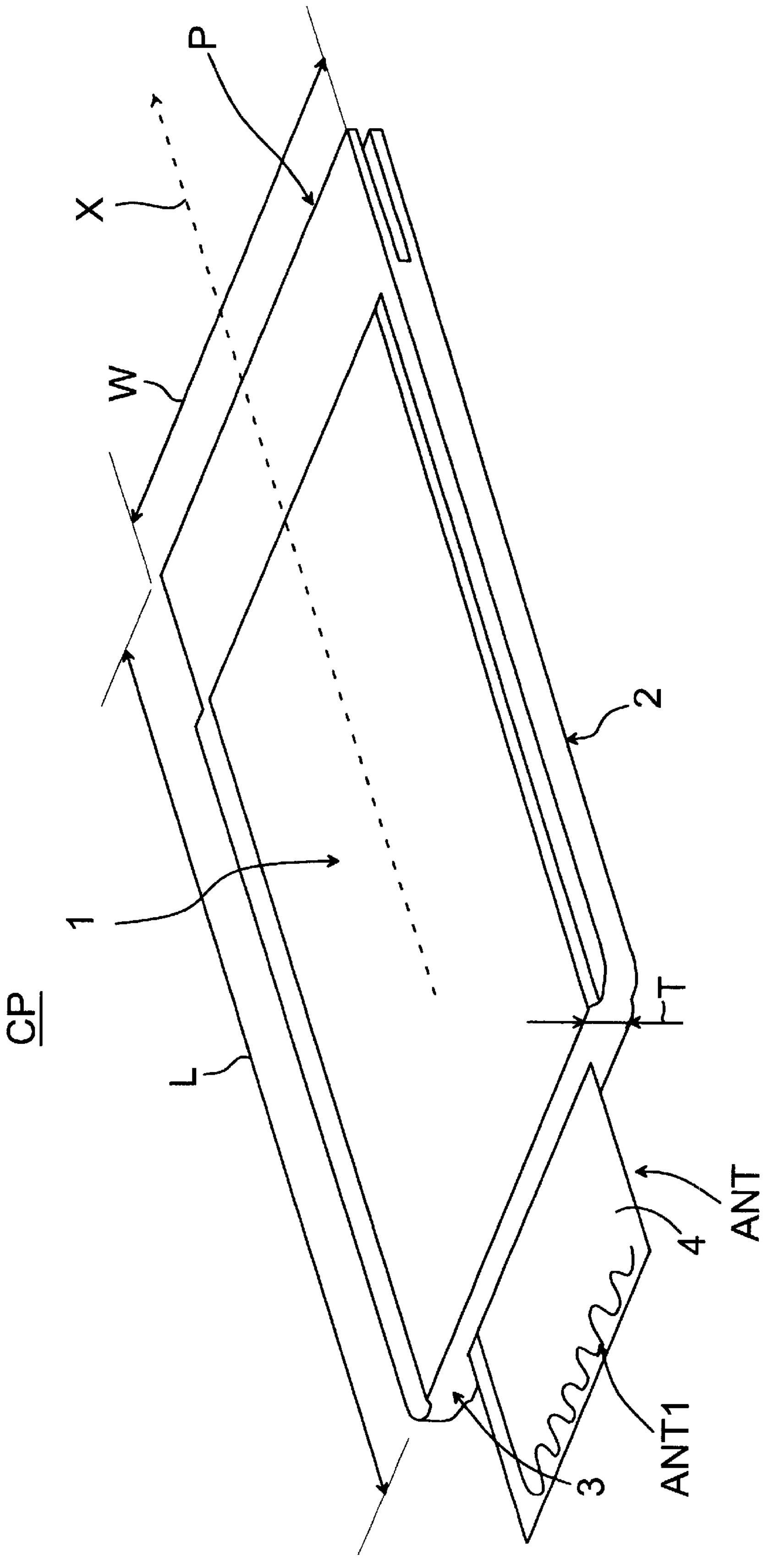
Figure 3:
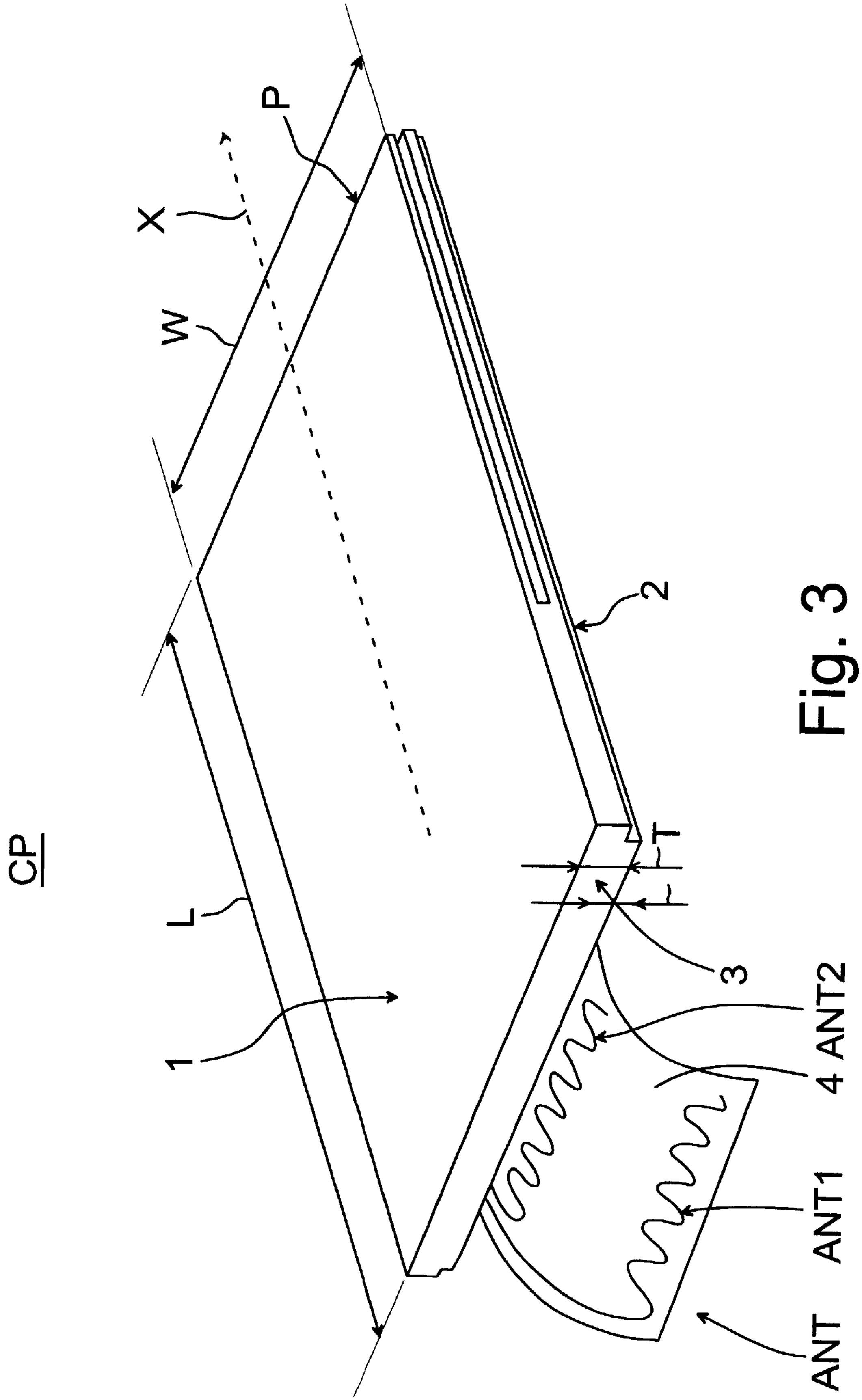

In the following, the invention will be described in more detail with reference to the appended drawings, in which FIG. 1 shows a perspective view on a card-like wireless communication device according to prior art, FIG. 2 shows a perspective view on a first preferred embodiment of the card-like wireless communication device according to the invention in the unfolded position of the strip, and FIG. 3 shows a perspective view on a second preferred embodiment of the card-like wireless communication device according to the invention in the folded position of the strip.

FIG. 2 shows an expansion card according to a first preferred embodiment of the invention, which is a card-like wireless communication device CP and which is a PC card complying with the PCMCIA standard. According to the PCMCIA standard, the length L of the PC card is 85.6 mm and the width W is 54 mm. The PC cards are divided into three types, wherein the thickness T of the PC card can be 3.3 mm (type I), 5.0 mm (type II) or 10.5 mm (type III). The PC cards are designed to be fully inserted in a PC by a movement in the direction of the longitudinal axis X of the PC card, but so-called extended PC cards can be even 40 mm longer than ordinary PC cards. The PC card is equipped with a 68-pin connector P complying with the PCMCIA standard, by means of which the PC card is connected e.g. to a PC. The pin P is arranged in the frame structure edging the PC card at the end of the PC card.

With reference to FIG. 2, the connector P is normally fixed to a circuit board placed inside the PC card (not shown in the figure), which is also equipped with all the components (e.g. IC) required for the operations of the PC card and the wirings for conducting the electrical signals between the connectors and the components. The PC card normally comprises a cover surface 1, a bottom surface 2, and an enclosing outer surface 3, which consists at least partly of a frame structure edging the PC card on all sides and which is substantially transverse to the surfaces 1 and 2. The peripheral outer surface 3 consists of four straight outer surfaces which are placed at substantially right angles to each other. In the PC card, the connector P, the circuit board, the frame structure, and the cover structures forming the cover surface 1 and the bottom surface 2 are assembled to form a PC card according to FIG. 2. The cover structures are normally formed of a thin metal sheet with a substantially even thickness. The connector P and the frame structure are normally at least partly of plastic, such as polyethylene (PE). It is obvious that the frame structure can comprise several separate parts and the connector structure P can be integrated in the frame structure. It is also obvious that the frame structure can at least partly constitute the cover surface 2 and/or the bottom surface 2 together with the cover structures. It is obvious that the frame structure can comprise several separate parts and the connector P can constitute a part of the frame structure. It is also obvious that the structure of the cover structures and their attachment to the frame structure may vary. Moreover, the cover structures can partly form the outer surface 3 by extending on top of the frame structure.

According to the invention as shown in FIG. 2, the antenna structure ANT of the card-like wireless communication device CP is formed as a flexible strip 4. In FIG. 2, the strip 4 is shown in its straightened position, wherein it extends outside said outer surface 3 and is also placed in parallel with said cover surface 1 and bottom surface 2. The strip 4 extends outside the closed area formed by the outer surface 3 and simultaneously outside the card CP, particularly outside its second end, to make it possible to pull the card CP out from the expansion card interface slot of an electronic device. As shown in FIG. 2, in the unfolded position of the strip 4 it is also placed between the planes defined by the cover surface 1 and the bottom surface 2, and as shown in FIG. 3, it joins one of said planes. The frame structure forming the outer surface 3 of the CP card is well suited for the attachment of the strip 4, because it is normally made of plastic and does therefore not interfere with the electrical operation of the antenna structure ANT. In the presented embodiment, the strip 4 is fixed in a stationary and immobile way at the centre of the outer surface 3 by an attachment in the direction of the cover surface 1, at the end of the card CP opposite to the connector P and symmetrically in relation to the longitudinal direction of the card CP. Thus, the strip 4 can be used to pull out the card CP from the expansion card interface slot, because in its straightened position the strip 4 protrudes from the interface. The strip 4 is preferably solid to prevent tearing. In FIG. 2, the strip is planar and rectangular, its one long side being attached to the card CP.

The strip 4 is made e.g. of a fabric containing plastic. It is also possible to use flexible PCB materials (Printed Circuit Board). In an antenna structure ANT integrated in a strip, the antenna, normally an antenna wire, is e.g. printed, laminated or woven inside the material or on the outer surface of the strip. The strip 4 can also be equipped with texts, instructions and logos. The strip 4 must be sufficiently strong under tensile stress so that it would not be torn or broken when used for pulling out. The strip 4 is preferably arranged spring-like, wherein if released, it will be set in the straightened position shown in FIG. 2. The antenna structure ANT formed by the strip 4 comprises an antenna element ANT1 which is arranged at the outermost end of the strip 4 as far from the card CP as possible and at the same time from the electronic device, to reduce the effect of electromagnetic interference.

FIG. 3 shows an expansion card according to a second advantageous embodiment of the invention, which is a card-like wireless communication device CP and which is a CF card complying with the CFA standard. The length L of the CF card is 42.8 mm, the width W is 36.4 mm and the thickness T is 3.3 mm (type I) or 5 mm (type II). The references and numerals of FIG. 3 refer also to the parts shown in FIG. 2 and to the description above. The CF card is equipped with a 50-pin connector P complying with the CFA standard.

According to the invention, as shown in FIG. 3, the antenna structure ANT of the card-like wireless communication device CP is formed as a flexible strip 4, wherein the antenna structure ANT comprises two antenna elements ANT1 and ANT2 transverse to the longitudinal direction X of the card CP. The strip 4 mentioned in the FIG. 3 is illustrated in a slightly bent position. In the presented embodiment, the strip 4 is attached to the edge of the outer surface 3 in a fixed and immobile way with an attachment in the direction of the bottom surface 2, at the end of the card CP opposite to the connector P. Thus, the strip 4 can be used to pull out the card form the expansion card interface slot, because the strip 4 protrudes from the interface.

The antenna element ANT1 is arranged at the outermost end of the strip 4 and the antenna element ANT2 is arranged close to the outer surface 3. When the strip 4 is bent in such a way that it is positioned e.g. against the cover surface 1 and the antenna element ANT1 is simultaneously brought closer to the connector P, the antenna element ANT2 is placed in the bent part of the strip 4 farthest away from the card CP. It is thus placed as far from the card CP as possible and simultaneously from the electronic device, to reduce the effect of interference. The electrical operation of the antenna structure is also disturbed by the metal-containing parts of the electronic device and the connection. The more detailed implementation of the antenna elements ANT1 may vary and is, on the basis of the above description, obvious for anyone skilled in the art. It is also obvious that the strip 4 can also be bent against the cover surface 1 and the bottom surface 2 in FIG. 2. Moreover, it is obvious that the attachment point of the strip 4 can differ from that presented, wherein the strip 4 is attached to the cover surface 1 or the bottom surface 2 but, according to the invention, extends in its straightened position outside the outer surface 3 parallel to the cover surface 1 and the bottom surface 2, wherein the strip 4 can be brought out from the interface and be folded on the opposite side of the card CP, if necessary.

It is obvious that the invention is not limited solely to the above-presented advantageous embodiments of the invention but it may vary within the scope of the claims.

What is claimed is:

1. A wireless communication device card, which card comprises a cover surface and a bottom surface as well as an outer surface edging said card, and which card further comprises at least an antenna structure, wherein said antenna structure is arranged as a flexible strip directly attaching to said card and extending at least partly outside said outer surface so as to hang free of said card.

2. The wireless communication device card according to claim 1, wherein said strip is arranged foldable against said card.

3. The wireless communication device card according to claim 1, wherein said strip is also arranged for pulling out said card from an expansion card interface slot.

4. The wireless communication device card according to claim 1, wherein said antenna structure comprises at least a first antenna element and at least a second antenna element, which antenna elements are placed in said strip outside said outer surface, wherein said first antenna element is placed further away from said outer surface and said second antenna element is placed close to said outer surface.

5. The wireless communication device card according to claim 1, wherein it is formed at least partly as an expansion card complying with the PCMCIA standard.

6. The wireless communication device card according to claim 1, wherein it is formed at least partly as an expansion card complying with the CFA standard.

7. A method in the manufacture of an expansion card for an electronic device, which card comprises a cover surface and a bottom surface as well as an outer surface edging said card, and which card further comprises at least an antenna structure, wherein said antenna structure is arranged as a flexible strip directly attaching to said card and extending at least partly outside said outer surface so as to hang free of said card.

8. The method according to claim 7, wherein said card is arranged as an adapter to connect another card of a smaller size to said electronic device.

9. An expansion card for an electronic device, which card comprises a cover surface and a bottom surface as well as an outer surface edging said card, and which card further comprises at least an antenna structure, wherein said antenna structure is arranged as a flexible strip directly attaching to said card and extending at least partly outside said outer surface so as to hang free of said card.

10. The expansion card according to claim 9, wherein said card is arranged as an adapter to connect another card of a smaller size to said electronic device.

11. A wireless communication device card, which card comprises a cover surface and a bottom surface as well as an outer surface edging said card, and which card further comprises at least an antenna structure, wherein said antenna structure is arranged as a flexible strip attaching to said card and extending at least partly outside said outer surface; wherein said antenna structure further comprises at least a first antenna element and at least a second antenna element, which antenna elements are placed in said strip outside said outer surface, and wherein said first antenna element is placed further away from said outer surface and said second antenna element is placed close to said outer surface.

12. The wireless communication device card according to claim 11, wherein said strip is arranged foldable against said card.

13. The wireless communication device card according to claim 11, wherein said strip is also arranged for pulling out said card from an expansion card interface slot.

14. The wireless communication device card according to claim 11, wherein it is formed at least partly as an expansion card complying with the PCMCIA standard.

15. The wireless communication device card according to claim 11, wherein it is formed at least partly as an expansion card complying with the CFA standard.

* * * * *